US007183528B1

(12) United States Patent
Liao

(10) Patent No.: US 7,183,528 B1
(45) Date of Patent: Feb. 27, 2007

(54) MICROWAVE ANTI-HEAT SUPPORTER

(76) Inventor: Frank Liao, 1295 Johnson Dr., City of Industry, CA (US) 91745

( * ) Notice: Subject to any disclaimer, the term of this patent is extended or adjusted under 35 U.S.C. 154(b) by 0 days.

(21) Appl. No.: 11/340,902

(22) Filed: Jan. 27, 2006

(51) Int. Cl.
*H05B 6/80* (2006.01)
*A47J 36/34* (2006.01)

(52) U.S. Cl. ...................... 219/732; 219/733; 219/762; 99/DIG. 14

(58) Field of Classification Search ........ 219/725–735, 219/762, 763; 99/DIG. 14; 426/241, 243
See application file for complete search history.

(56) References Cited

U.S. PATENT DOCUMENTS 5,223,685 A * 6/1993 DeRienzo, Jr. ............. 219/732
5,593,610 A * 1/1997 Minerich et al. ........... 219/734
5,672,292 A * 9/1997 Villar Otero ................ 219/732

* cited by examiner

*Primary Examiner*—Philip H. Leung
(74) *Attorney, Agent, or Firm*—Raymond Y. Chan; David And Raymond Patent Group

(57) ABSTRACT

A microwave anti-heat supporter for a piece of food to be heated by microwave includes a heating platform, a plurality of supporting legs, and a heating arrangement. The heating platform has an upper supporting surface for the food resting thereon, and a lower ventilating surface. The supporting legs downwardly extend from the ventilating surface of the heating platform to raise up the supporting surface of the heating platform in a suspended manner. The heating arrangement contains a plurality of through ventilating slots spacedly formed on the heating platform to communicate the supporting surface with the ventilating surface, in such a manner that the ventilating slots are adapted for allowing the microwave to circulate from the ventilating surface to the supporting surface so as to effectively generate a uniform heat applying at the food on the heating platform at all directions.

20 Claims, 4 Drawing Sheets

MICROWAVE ANTI-HEAT SUPPORTER

BACKGROUND OF THE PRESENT INVENTION

1. Field of Invention

The present invention relates to a microwave accessory, and more particularly to a microwave anti-heat supporter for use in a microwave oven which is capable of providing uniform heat transfers to a food product supported on the microwave anti-heat supporter.

2. Description of Related Arts

Microwave ovens have been widely utilized for rapid heating of food. The basic principle of a conventional microwave oven is that the microwave often is arranged to generate controlled microwave radiation within a cooking compartment so as to heat up water molecules in the cooking compartment. A typical application of the microwave oven is that the user may put a piece of food on a container which is put in the cooking compartment. The user may then turn on the microwave oven for a specified period of time. The microwave generated within the cooking compartment will heat up the water molecules contained in the food and the water molecules will then heat up the entire piece of food in the cooking compartment.

A major problem for the conventional microwave oven's application is that it is difficult to achieve uniform heating within the cooking compartment. More specifically, since the food is often put into a container, a bottom surface of the food is always in contact with the corresponding surface of the container. As a result, the extent to which the bottom surface is exposed to microwave is less than that of the remaining part of the food. As a result, the food cannot be uniformly heated and there would have some portions having higher temperature than others.

As an attempt to overcome this problem, one may try to heat the food for a prolonged period of time with a view to achieve an acceptably high temperature for the lower portion of the food. While this may mitigate the problem of insufficient cooking at certain portions of the food, but this practice also causes other portions of that food to be overcooked.

SUMMARY OF THE PRESENT INVENTION

A main object of the present invention is to provide a microwave anti-heat supporter for use in a microwave oven which is capable of providing uniform heat transfers to a food product supported on the microwave anti-heat supporter.

Another object of the present invention is to provide a microwave anti-heat supporter for use in a microwave oven, which comprises a heating arrangement containing a plurality of through ventilating slots for allowing the microwave to propagate through the microwave anti-heat supporter so as to effectively generate a uniform heat applying on the food from all directions.

Another object of the present invention is to provide a microwave anti-heat supporter for use in a microwave oven, which is made of heat insulating materials for preventing overheating of the microwave anti-heat supporter while ensuring uniform heat transfers at the food product supported on the microwave anti-heat supporter.

Another object of the present invention is to provide a microwave anti-heat supporter for use in a microwave oven, which is capable of supporting a wide variety of foods for facilitating uniform heating thereof.

Another object of the present invention is to provide a microwave anti-heat supporter for use in a microwave oven, which does not involve complicated mechanical components so as to minimize the manufacturing cost and the ultimate selling price of the present invention.

Accordingly, in order to accomplish the above objects, the present invention provides a microwave anti-heat supporter for a piece of food to be heated by microwave, comprising:

a heating platform having an upper supporting surface for the food resting thereon, and a lower ventilating surface;

a plurality of supporting legs downwardly extended from the ventilating surface of the heating platform to raise up the supporting surface of the heating platform in a suspended manner; and a heating arrangement which contains a plurality of through ventilating slots spacedly formed on the heating platform to communicate the supporting surface with the ventilating surface, in such a manner that the ventilating slots are adapted for allowing the microwave to circulate from the ventilating surface to the supporting surface so as to effectively generate a uniform heat applying at the food on the heating platform at all directions.

These and other objectives, features, and advantages of the present invention will become apparent from the following detailed description, the accompanying drawings, and the appended claims.

DETAILED DESCRIPTION OF THE PREFERRED EMBODIMENT

Figure 1:
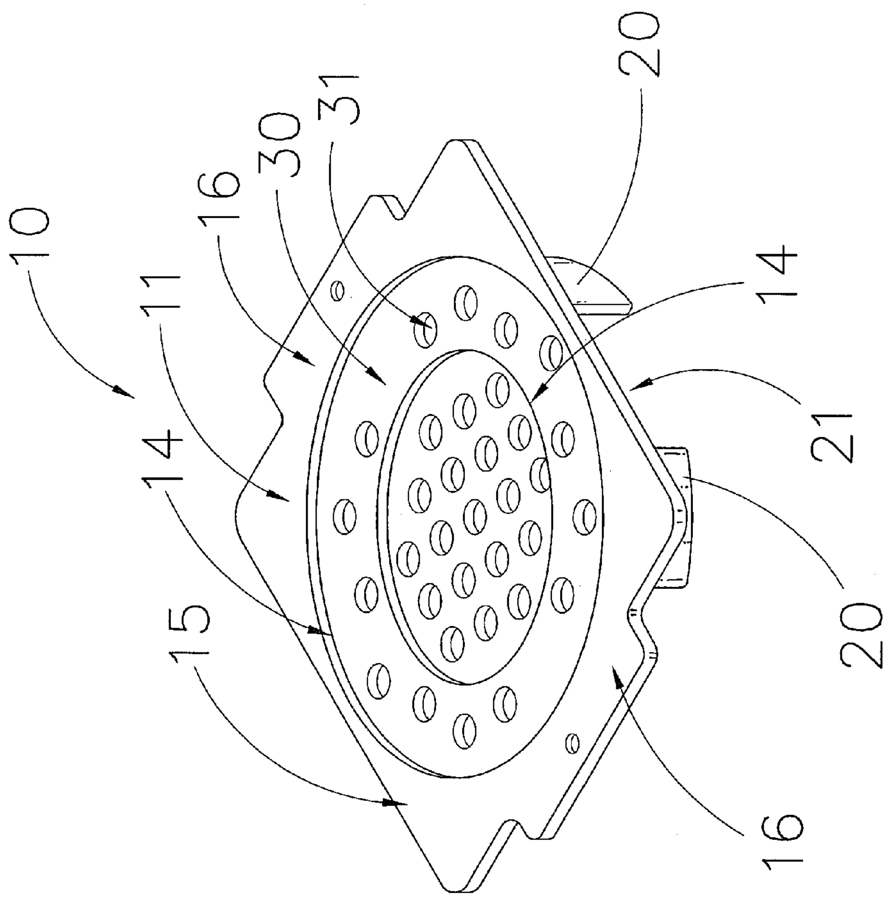
FIG. 1 is a perspective view of a microwave anti-heat supporter according to a preferred embodiment of the present invention.
Figure 2:
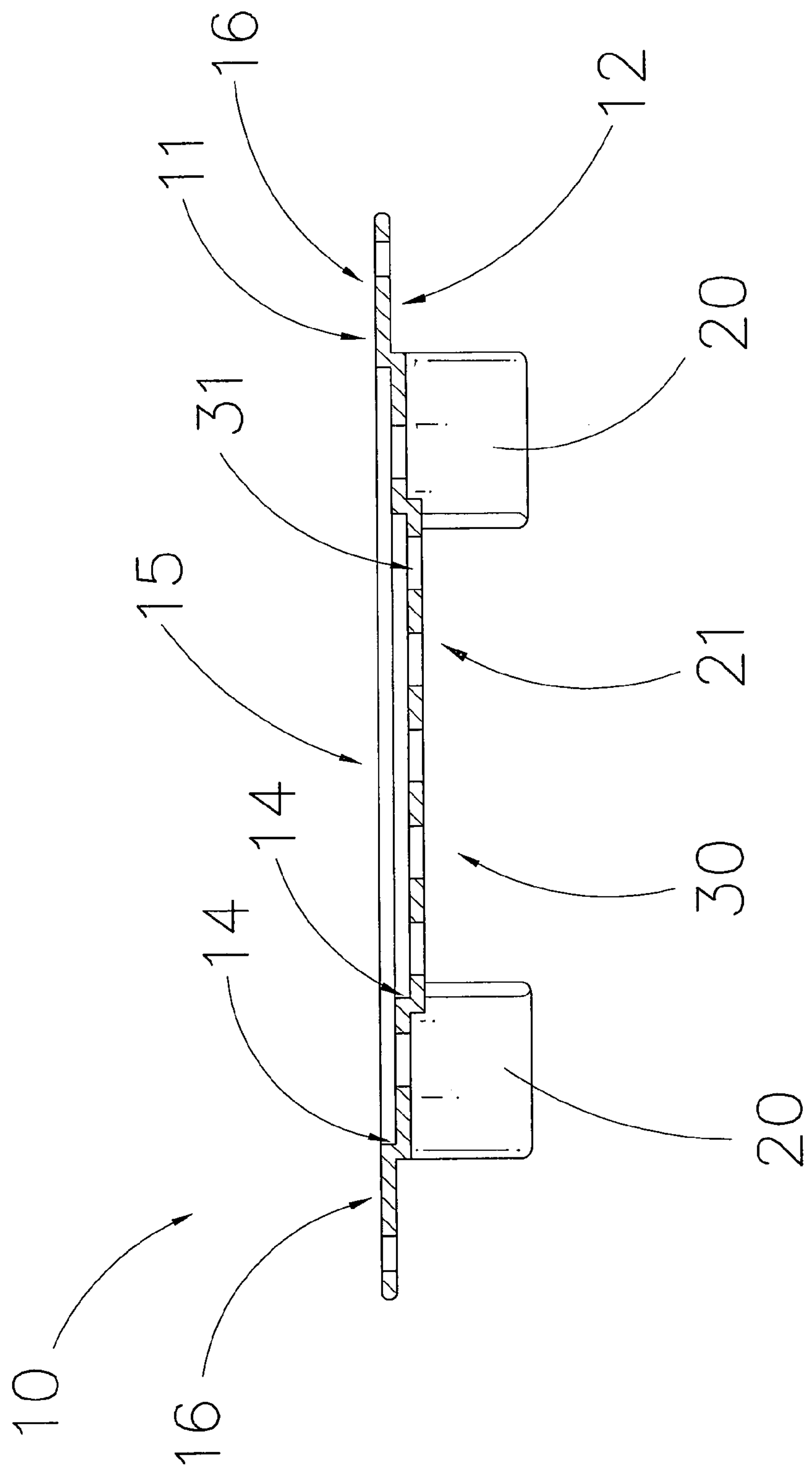
FIG. 2 is a sectional side view of the microwave anti-heat supporter according to the above preferred embodiment of the present invention.
Figure 3:
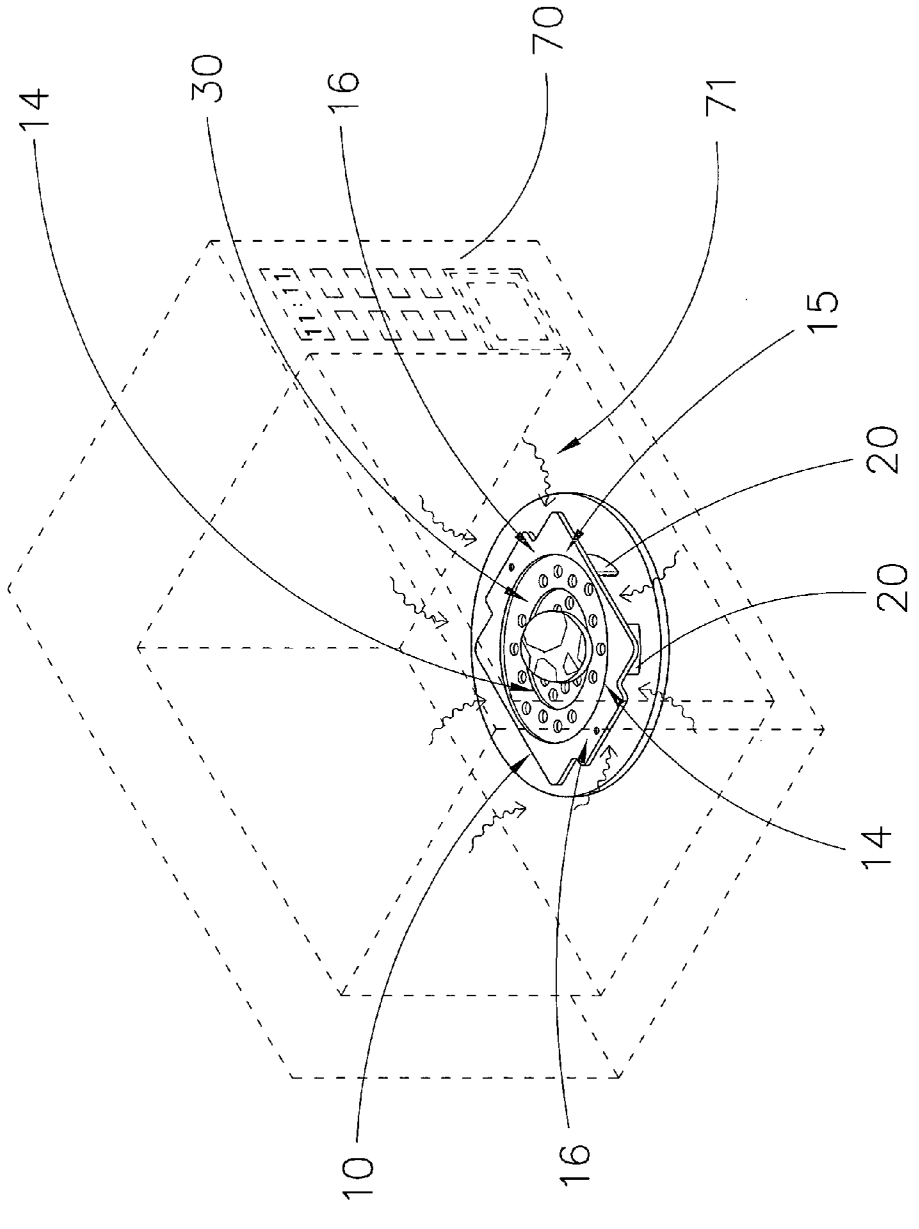
FIG. 3 is a schematic diagram of the microwave anti-heat supporter according to the above preferred embodiment of the present invention.

Referring to FIG. 1 to FIG. 3 of the drawings, a microwave anti-heat supporter for a food product according to a preferred embodiment of the present invention is illustrated, in which the microwave anti-heat supporter comprises a heating platform 10, a plurality of supporting legs 20, and a heating arrangement 30. According to the preferred embodiment, the food product is to be heated by microwave in a typical microwave oven 70 having a cooking cavity 71.

The heating platform 10 has an upper supporting surface 11 for the food product resting thereon, and a lower ventilating surface 12.

The plurality of supporting legs 20 is downwardly extended from the ventilating surface 12 of the heating platform 10 to elevate the supporting surface 11 of the heating platform 10 in a suspended manner with respect to a microwave oven floor of the microwave oven 70.

The heating arrangement 30 contains a plurality of through ventilating slots 31 spacedly formed on the heating platform 10 to communicate the supporting surface 11 with the ventilating surface 12, in such a manner that the ventilating slots 31 are adapted for allowing the microwave to circulate from the ventilating surface 12 to the supporting surface 11 so as to effectively improve a uniform heat applying at the food product on the heating platform 10 at all directions.

According to the preferred embodiment of the present invention, the heating platform 10 is made of heat-insulating microwaveable materials so that when the microwave anti-heat supporter is placed into the microwave oven 70, the heating platform 10 is prevented from being overheated. More specifically, the heating platform 10 is made of Polypropylene.

Referring to FIG. 1 to FIG. 2 of the drawings, the heating platform 10 further has a center food retention portion 15 and a peripheral handle portion 16 outwardly extended therefrom, wherein the ventilating slots 31 are evenly formed at food retention portion 15 of the heating platform 10 while the supporting legs 20 are spacedly and downwardly extended from the handle portion 16 of the heating platform 10.

Referring to FIG. 1 to FIG. 2 of the drawings, the heating platform 10 further has a plurality of retaining ribs 14 indently formed on the supporting surface 11 of the heating platform 10 within the food retention portion 16 thereof, wherein each of the retaining ribs 14 forms a circular boundary for resisting a sideward sliding movement of the food product when the food product is supported at the food retention portion 16 of the heating platform 10.

More specifically, the retaining ribs 14 divide the supporting surface 11 into a corresponding number of food retention sectors, wherein each of the food retention sectors has different heights with respect to a flat surface on which the microwave anti-heat supporter is standing, so that a boundary between each two food retention sectors is adapted to effectively resist a sideward movement of the food supported on the supporting surface 11 for retaining the food product on a predetermined position of the supporting surface 11.

Therefore, each of the retaining ribs 14 has a circular cross section having a diameter smaller than a width of the heat platform 10, wherein the retaining ribs 14 are spacedly and coaxially formed on the supporting surface 11 to define the corresponding number of food retention sectors. According to the preferred embodiment of the present invention, there are altogether two retaining ribs 14 formed on the heat platform 10, defining two food retention sectors which are indently formed on the supporting surface 11 at two different heights with respect to the flat surface on which the microwave anti-heat supporter is standing. Moreover, the heating platform 10 has a uniform thickness that the supporting surface 11 of the heating platform 10 is integrally extended in a step-stair manner at the retaining ribs 14.

In other words, the through ventilating slots 31 are spacedly formed on each of the food retention sectors on the supporting surface 11 so that no matter where the food product is put, the ventilating slots 31 are capable of allowing microwave radiation to pass therethrough for ensuring uniform heating of the food product.

The plurality of supporting legs 20 is downwardly and integrally extended from the ventilating surface 12 of the heat platform 10 for supporting it in the suspended manner and defining a ventilating height as a height of each of the supporting legs 20, and a ventilating cavity 21 underneath the heating platform 10 and within the supporting legs 20, wherein the microwave radiation generated by the microwave oven 70 is capable of propagating therewithin and heat up a lower portion of the food product through penetrating the ventilating slots 31 of the heating arrangement 30.

Thus, the ventilating cavity 21 is formed within the supporting legs 20 and the food retention portion 15 of the heating platform 10 to communicate with the supporting surface 11 of the heating platform 10 through the ventilating slots 31 for allowing the microwave heating passing from the ventilating cavity 21 to the supporting surface 11 of the food retention portion 15 of the heating platform 10.

It is important to point out that since the supporting legs 20 raise the heating platform 10 at a predetermined elevation with respect to a bottom surface of the cooking cavity 71 of the microwave oven 70, the food retention sectors are indented to maximize a size of the food product which can be fitted within the cooking cavity 71 as supported on the heating platform 10.

Moreover, each of the supporting legs 20 are downwardly and spacedly extended from the ventilating surface 12 along a peripheral of the respective retaining rib 14 so as to reinforce a strength of the heating platform 10 loading with the food product thereon.

In order to ensure consistent and high quality performance of the present invention, the microwave anti-heat supporter is made of heat-insulating materials having a predetermined identical and uniform thickness so as to achieve identical heat transfer property among the entire microwave anti-heat supporter and at the same time minimize the manufacturing cost of the present invention.

The operation of the present invention is as follows: a user of the present invention may first put the food product, such as a piece of frozen meat, directly on the heating platform 10 and put the food product and the microwave anti-heat supporter into the cooking cavity 71 of the microwave oven 70. The user may then turn on the microwave oven 70 for heating the food product for a predetermined period of time. The microwave generated by the microwave oven 70 will then be allowed to propagate within the cooking cavity 71 and evenly heat up the food product from all directions. Alternatively, the user may first put the food product into a container of a suitable size and then put the container onto the heating platform 10. The microwave is then allowed to propagate within the cooking cavity 71 at all directions.

Figure 4:
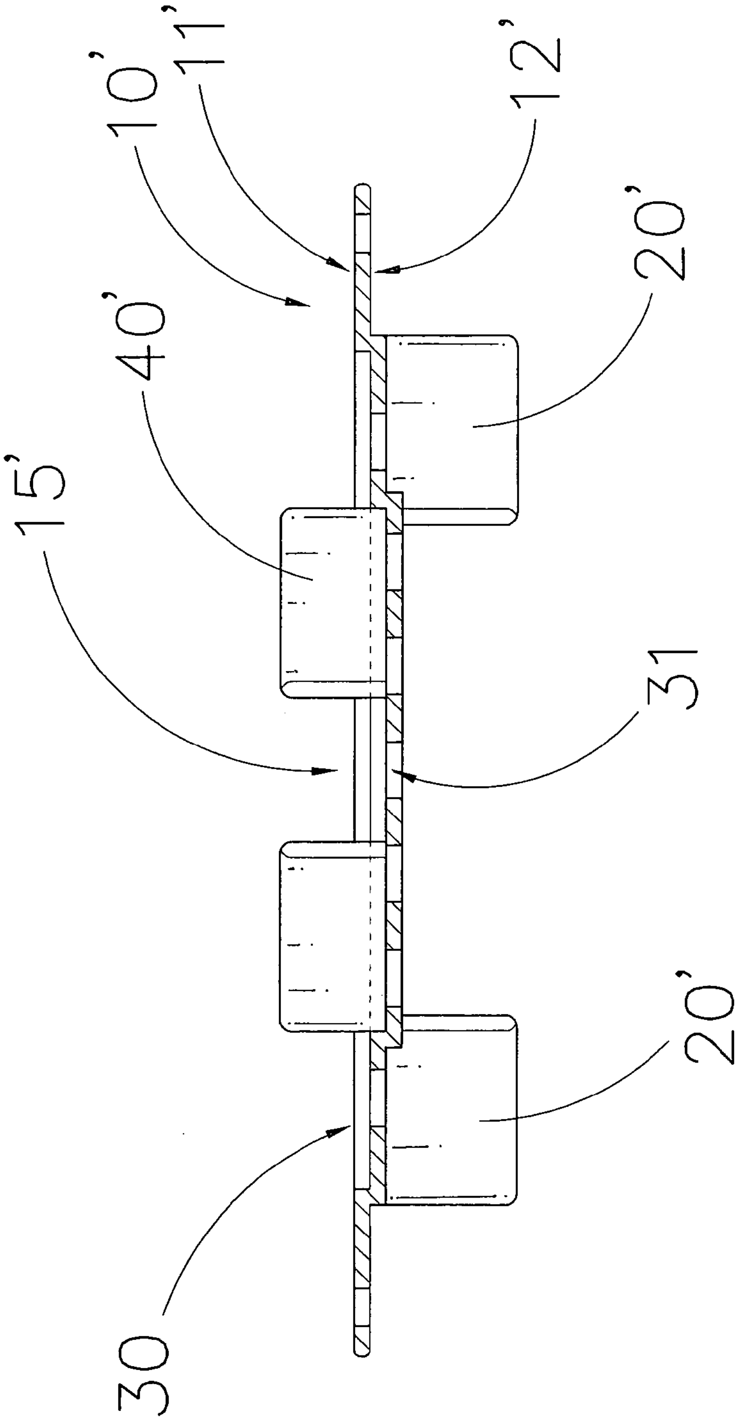
FIG. 4 is an alternative mode if the microwave anti-heat supporter according to the above preferred embodiment of the present invention.

Referring to FIG. 4 of the drawings, an alternative mode of the microwave anti-heat supporter according to the preferred embodiment of the present invention is illustrated. The alternative mode is similar to the preferred embodiment, except the addition of retaining walls 40'.

According to the alternative mode, the microwave anti-heat supporter further comprises a plurality of retaining walls 40' upwardly and coaxially extended from the supporting surface 11' of the heating platform 10' within the food retention portion 15' thereof, wherein a circumferential size within the retaining walls 40' is smaller than a circumferential size within the supporting legs 20', such that the heating platform 10' is flippably used that when the supporting surface 11' of the heating platform 10' faces upwardly, the retaining walls 40' forms a smaller circular boundary for resisting a sideward sliding movement of the food product, and when the ventilating surface 12' of the heating platform 10' faces upwardly, the supporting legs 20' forms a larger circular boundary while the retaining walls 40' elevate the ventilating surface 12' of the heating platform 10' with respect to the microwave oven floor of the microwave oven 70.

In other words, according to the alternative mode of the present invention, the microwave anti-heat supporter is capable of being utilized at on both sides of the heating platform 10' having food retention portions 15' of differing diameters, so as to maximum the range of food products which can be put onto the heating platform 10'. The user is then able to freely select which side of the heating platform 10' should be used. It is worth mentioning that a height of each of the retaining walls 40' is shorter than a height of each of the supporting legs 20', so that the microwave anti-heat supporter is capable of being compactly put into the microwave oven 70.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A microwave anti-heat supporter for microwave heating a food product in a microwave oven, comprising:

a heating platform having a supporting surface, an opposed ventilating surface, a center food retention portion for retaining said food product thereat and peripheral handle portion outwardly extended from said food retention portion, wherein said heating platform is flippably used that when said ventilating surface of said heating platform faces downwardly, said heating platform is adapted for supporting said food product on said supporting surface within said food retention portion, and when said supporting surface of said heating platform faces downwardly, said heating platform is adapted for supporting said food product on said ventilating surface within said food retention portion;

a plurality of supporting legs coaxially and spacedly extended from said ventilating surface of said heating platform to form a ventilating cavity within said supporting legs when said ventilating surface faces downward and to form a circular boundary for retaining said food product therewithin when said ventilating surface faces upward, wherein said supporting surface of said heating platform is elevated with respect to a microwave oven floor of said microwave oven when said supporting legs stand thereon;

a retaining rib indently and coaxially formed on said supporting surface of said heating platform, such that said retaining rib forms a circular boundary for resisting a sideward sliding movement of said food product when said food product is supported at said food retention portion of said heating platform; and a heating arrangement which contains a plurality of through ventilating slots spacedly formed on said heating platform within said food retention portion thereof to communicate said supporting surface with said ventilating surface, wherein when said heating platform is flippably used for supporting said food product on one of said supporting surface and said ventilating surface, said ventilating slots are adapted for allowing said microwave heat to circulate from said ventilating surface to said supporting surface so as to effectively improve a uniform heat applying at said food product on said heating platform at all directions.

2. The microwave anti-heat supporter, as recited in claim 1, wherein said ventilating slots are evenly formed at food retention portion of said heating platform for circulating microwave heat when said food product is selectively supported on one of said supporting surface and said ventilating surface of said heating platform.

3. The microwave anti-heat supporter, as recited in claim 2, wherein said supporting legs are integrally and spacedly extended from said ventilating surface along a peripheral of said retaining rib so as to reinforce a strength of said heating platform for loading with said food product thereon.

4. The microwave anti-heat supporter, as recited in claim 3, wherein said heating platform further has an additional retaining rib indently and coaxially formed on said supporting surface of said heating platform within said food retention portion thereof, such that each of said retaining ribs forms said circular boundary for selectively retaining said food product on said supporting platform within one of said retaining ribs.

5. The microwave anti-heat supporter, as recited in claim 4, wherein said heating platform has a uniform thickness that said supporting surface of said heating platform is integrally extended in a step-stair manner at said retaining ribs.

6. The microwave anti-heat supporter, as recited in claim 5, further comprising a plurality of retaining walls upwardly and coaxially extended from said supporting surface of said heating platform within said food retention portion thereof, wherein a circumferential size within said retaining walls is smaller than a circumferential size within said supporting legs, such that when said supporting surface of said heating platform faces upwardly, said retaining walls forms a smaller circular boundary for resisting a sideward sliding movement of said food product and when said ventilating surface of said heating platform faces upwardly, said supporting legs forms a larger circular boundary.

7. The microwave anti-heat supporter, as recited in claim 6, wherein a height of each of said retaining walls is shorter than a height of each of said supporting legs.

8. The microwave anti-heat supporter, as recited in claim 7, wherein said heating platform is made of heat-insulating microwaveable material for preventing being heated up when said uniform heat is applied at said food product on said heating platform.

9. The microwave anti-heat supporter, as recited in claim 7, wherein said heating platform is made of Polypropylene.

10. The microwave anti-heat supporter, as recited in claim 3, further comprising a plurality of retaining walls upwardly and coaxially extended from said supporting surface of said heating platform within said food retention portion thereof, wherein a circumferential size within said retaining walls is smaller than a circumferential size within said supporting legs, such that when said supporting surface of said heating platform faces upwardly, said retaining walls forms a smaller circular boundary for resisting a sideward sliding movement of said food product and when said ventilating surface of said heating platform faces upwardly, said supporting legs forms a larger circular boundary.

11. The microwave anti-heat supporter, as recited in claim 10, wherein a height of each of said retaining walls is shorter than a height of each of said supporting legs.

12. The microwave anti-heat supporter, as recited in claim 3, wherein said heating platform is made of heat-insulating microwaveable material for preventing being heated up when said uniform heat is applied at said food product on said heating platform.

13. The microwave anti-heat supporter, as recited in claim 3, wherein said heating platform is made of Polypropylene.

14. The microwave anti-heat supporter, as recited in claim 2, wherein said heating platform further has an additional retaining rib indently and coaxially formed on said supporting surface of said heating platform within said food retention portion thereof, such that each of said retaining ribs forms said circular boundary for selectively retaining said food product on said supporting platform within one of said retaining ribs.

15. The microwave anti-heat supporter, as recited in claim 14, wherein said heating platform has a uniform thickness that said supporting surface of said heating platform is integrally extended in a step-stair manner at said retaining ribs.

16. The microwave anti-heat supporter, as recited in claim 1, wherein said supporting legs are integrally and spacedly extended from said ventilating surface along a peripheral of said retaining rib so as to reinforce a strength of said heating platform for loading with said food product thereon.

17. The microwave anti-heat supporter, as recited in claim 1, wherein said heating platform further has an additional retaining rib indently and coaxially formed on said supporting surface of said heating platform within said food retention portion thereof, such that each of said retaining ribs forms said circular boundary for selectively retaining said food product on said supporting platform within one of said retaining ribs.

18. The microwave anti-heat supporter, as recited in claim 17, wherein said heating platform has a uniform thickness that said supporting surface of said heating platform is integrally extended in a step-stair manner at said retaining ribs.

19. The microwave anti-heat supporter, as recited in claim 1, further comprising a plurality of retaining walls upwardly and coaxially extended from said supporting surface of said heating platform within said food retention portion thereof, wherein a circumferential size within said retaining walls is smaller than a circumferential size within said supporting legs, such that when said supporting surface of said heating platform faces upwardly, said retaining walls forms a smaller circular boundary for resisting a sideward sliding movement of said food product and when said ventilating surface of said heating platform faces upwardly, said supporting legs forms a larger circular boundary.

20. The microwave anti-heat supporter, as recited in claim 19, wherein a height of each of said retaining walls is shorter than a height of each of said supporting legs.

* * * * *

UNITED STATES PATENT AND TRADEMARK OFFICE
Certificate

Patent No. 7,183,528 B1 Patented: February 27, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Frank Liao, City of Industry, CA (US); and David Han, Los Angeles, CA (US).

Signed and Sealed this Seventeenth Day of April 2012.

HENRY C. YUEN
*Supervisory Patent Examiner*
Art Unit 3742
Technology Center 3700